United States Patent
Shen et al.

(10) Patent No.: US 8,347,002 B2
(45) Date of Patent: Jan. 1, 2013

(54) METHOD AND APPARATUS FOR TRANSMITTING A VIDEO SIGNAL WITH COMBINED COLOR SIGNAL

(75) Inventors: Fu-Chin Shen, Taipei Hsien (TW); Chia-Cheng Liu, Taipei Hsien (TW)

(73) Assignee: Aten International Co., Ltd., Shijr (TW)

( * ) Notice: Subject to any disclaimer, the term of this patent is extended or adjusted under 35 U.S.C. 154(b) by 1455 days.

(21) Appl. No.: 11/858,311

(22) Filed: Sep. 20, 2007

(65) Prior Publication Data
US 2009/0079868 A1     Mar. 26, 2009

(51) Int. Cl.
G06F 13/12       (2006.01)
G06F 3/02        (2006.01)

(52) U.S. Cl. .............. 710/65; 710/72; 345/168
(58) Field of Classification Search .......... 348/469, 348/495, 723; 375/295, 257; 709/222, 250, 709/208, 232, 228; 345/163, 168, 213, 2.1; 710/65, 72, 15, 16, 36, 62, 313, 315, 305; 379/93.01, 93.17, 93.08; 725/131, 139, 151
See application file for complete search history.

(56) References Cited

U.S. PATENT DOCUMENTS

| | | | | |
|---|---|---|---|---|
| 4,338,597 | A * | 7/1982 | Steiner et al. ............ | 345/213 |
| 5,936,680 | A | 8/1999 | Kajiwara et al. | |
| 6,456,332 | B1 | 9/2002 | Song | |
| 6,557,170 | B1 | 4/2003 | Wilder et al. | |
| 7,324,122 | B2 | 1/2008 | Tsai | |
| 2001/0022580 | A1 | 9/2001 | Sung | |
| 2004/0228459 | A1 * | 11/2004 | Gershfeld ............ | 379/93.01 |
| 2005/0027890 | A1 | 2/2005 | Nelson et al. | |
| 2005/0058293 | A1 * | 3/2005 | Higurashi ............ | 380/274 |
| 2005/0165994 | A1 | 7/2005 | Dickens | |
| 2005/0246433 | A1 * | 11/2005 | Carrigan et al. ......... | 709/223 |
| 2007/0079348 | A1 | 4/2007 | King et al. | |
| 2007/0086173 | A1 | 4/2007 | Chang et al. | |
| 2007/0165391 | A1 | 7/2007 | Charna et al. | |
| 2008/0126629 | A1 * | 5/2008 | Huang .................. | 710/64 |
| 2008/0218633 | A1 * | 9/2008 | Shen et al. ............ | 348/496 |
| 2009/0034936 | A1 * | 2/2009 | Frederick et al. ........ | 386/94 |
| 2010/0124270 | A1 * | 5/2010 | Yeh et al. ............ | 375/240.01 |

FOREIGN PATENT DOCUMENTS

TW       I222595 B     10/2004

OTHER PUBLICATIONS

Taiwanese Office Action, dated May 10, 2011, in a counterpart Taiwanese patent application, No. TW 096139761.
Chinese Office Action, dated Nov. 20, 2009, in a counterpart Chinese patent application, No. CN 2007101670231.

* cited by examiner

*Primary Examiner* — Victor Kostak
(74) *Attorney, Agent, or Firm* — Chen Yoshimura LLP

(57) ABSTRACT

An apparatus for transmitting a video signal includes a signal detector, a multiplexer and a transmitter. The signal detector detects the video signal from the source to determine whether the horizontal sync signal and the vertical sync signal of the video signal are independent or composite. The multiplexer generates a composite sync signal by combining the horizontal sync signal and the vertical sync signal with reference to timing characteristics of the horizontal sync signal and the vertical sync signal while the horizontal sync signal and the vertical sync signal are detected as independent signals, and passes the composite sync signal while the horizontal sync signal and the vertical sync signal are detected as the composite sync signal. The transmitter transmits the video signal with the composite sync signal to the destination via a media. A method for transmitting the video signal is also disclosed.

17 Claims, 7 Drawing Sheets

METHOD AND APPARATUS FOR TRANSMITTING A VIDEO SIGNAL WITH COMBINED COLOR SIGNAL

FIELD OF INVENTION

The present invention relates to the video signal transmission. More particularly, the present invention relates to a method and apparatus for transmitting video signals with H-Sync and V-Sync signals.

DESCRIPTION OF RELATED ART

FIG. 1 illustrates a conventional KVM extender 100, which is used to transmit a video signal, a keyboard signal (not shown) and a mouse signal (not shown) from a computer 112 to a monitor 114, a keyboard (not shown) and a mouse (not shown) via a cable 106. The KVM extender 100 includes a dongle device 102 and a console device 104 coupled to the computer 112 and the monitor 114, keyboard and mouse, respectively. Generally, the video signal provided from the computer 112 contains a horizontal sync signal (H), a vertical sync signal (V), a red color signal (R), a green color signal (G) and a blue color signal (B), and the cable 106 connecting the dongle and console devices 102 and 104, such as a CAT. 5 cable, has four pairs of wires.

The keyboard signal and the mouse signal must take at least one pair of wires for transmission. In order to transmit the five signals by the remaining three pairs of wires, the dongle device 102 of the conventional KVM extender 100 typically combines (or mixes) the horizontal sync signal (H) and the vertical sync signal (V) with the blue color signal (B) and the red color signal (R), respectively, and the console device 104 then separates (or restores) the horizontal sync signal (H) and the vertical sync signal (V) from the two combined color signals (H+B) and (V+R) after the cable 106.

By this conventional architecture, if the video signal provided from a computer to the dongle device 102 originally contains a composite sync signal (H+V), such as the video signal used in a Sun workstation, the dongle device 102 has to firstly decode the horizontal and vertical sync signals from the composite sync signal (H+V), and then combine each of the two sync signals (H) and (V) into one of the three color signals (R), (G) and (B) for transmitting through the cable 106 as mentioned above.

SUMMARY

According to one embodiment of the present invention, a method for transmitting a video signal is provided. The video signal has a horizontal sync signal and a vertical sync signal from a source to a destination. The video signal from the source is detected to determine whether the horizontal sync signal and the vertical sync signal are independent or composite. If the horizontal sync signal and the vertical sync signal are independent, a composite sync signal is generated by combining the horizontal sync signal and the vertical sync signal with reference to timing characteristics of the horizontal sync signal and the vertical sync signal. If the horizontal sync signal and the vertical sync signal are composite, the composite sync signal is passed for transmission. The video signal is transmitted with the composite sync signal to the destination via a media.

According to another embodiment of the present invention, an apparatus for transmitting a video signal comprises a signal detector, a multiplexer and a transmitter. The video signal has a horizontal sync signal and a vertical sync signal from a source to a destination. The signal detector detects the video signal from the source to determine whether the horizontal sync signal and the vertical sync signal are independent or composite. The multiplexer generates a composite sync signal by combining the horizontal sync signal and the vertical sync signal with reference to timing characteristics of the horizontal sync signal and the vertical sync signal while the horizontal sync signal and the vertical sync signal are detected as independent signals, and passes the composite sync signal while the horizontal sync signal and the vertical sync signal are detected as the composite sync signal. The transmitter transmits the video signal with the composite sync signal to the destination via a media.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
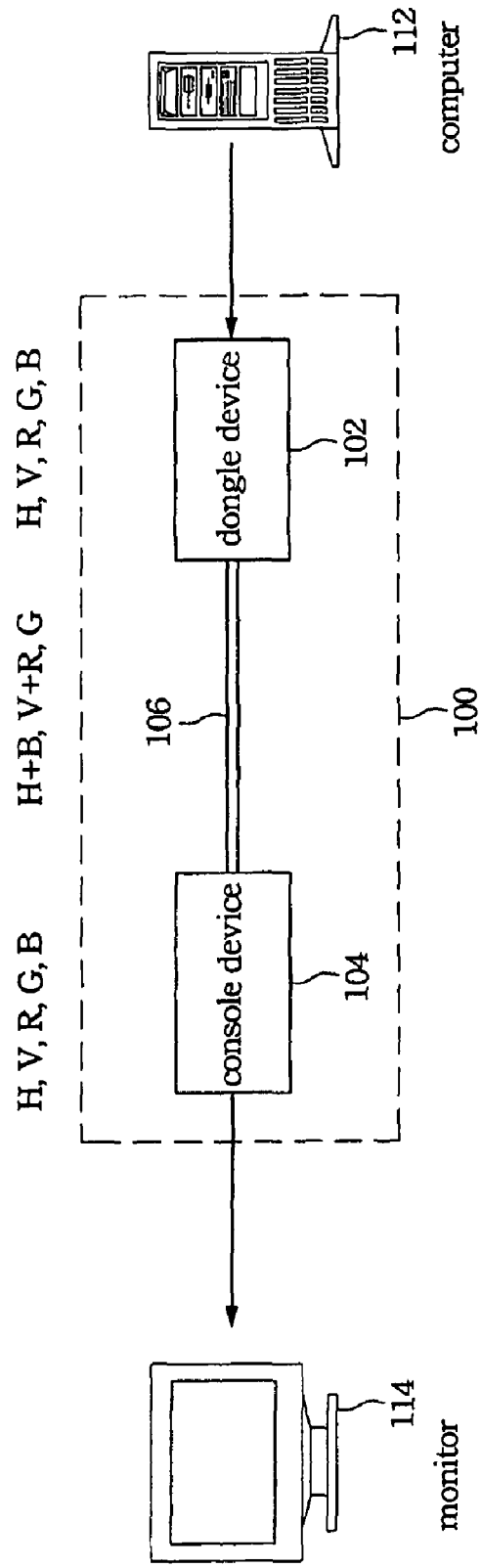
FIG. 1 illustrates a conventional KVM extender, which is used to transmit a video signal, a keyboard signal, and a mouse signal from a computer to a monitor, a keyboard and a mouse via a cable.

Reference will now be made in detail to the present preferred embodiments of the invention, examples of which are illustrated in the accompanying drawings. Wherever possible, the same reference numbers are used in the drawings and the description to refer to the same or like parts.

Figure 2:
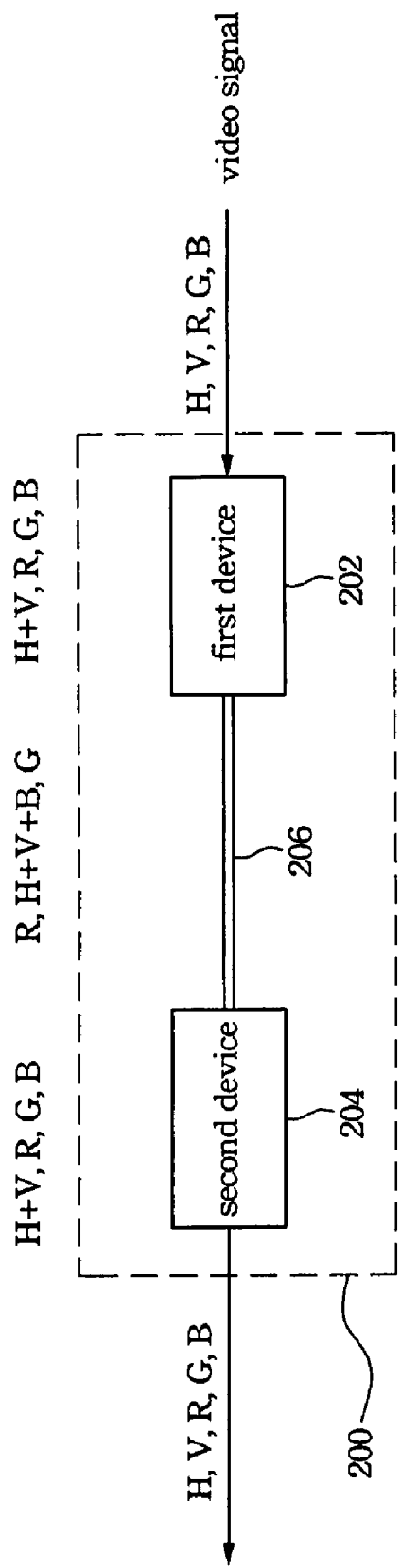
FIG. 2 is a system for transmitting video signals according to one example consistent with the present invention.

FIG. 2 is a system 200 for transmitting video signals according to one example consistent with the present invention. The system 200 includes, a first device 202 and a second device 204. The first device 202 receives the video signal, for example, from a computer device, to encode a horizontal sync signal (H) and a vertical sync signal (V) of the video signal into a composite sync signal (H+V), and combines the composite sync signal (H+V) into one of three color signals (R), (G) and (B) of the video signal, thus obtaining a combined color signal (for example, H+V+B). It is noted that the composite sync signal (H+V) encoded by the first device 202 can be combined into any of the three color signals, whether the red, green, or blue color signal, which is not limited by this example as illustrated in FIG. 2.

The first device 202 then transmits the three color signals (including the combined color signal) (R), (G) and (H+V+B), via the cable 206, or an optical fiber, or even wirelessly. The second device 204 is in communication with the first device 202, may via the cable 206, or the optical fiber, or even wirelessly. The second device 204 separates the composite sync signal (H+V) from the combined color signal (H+V+B), and separates (decodes) the horizontal sync signal (H) and the vertical sync signal (V) from the composite sync signal (H+V), for outputting to a monitor, for example.

Figure 3:
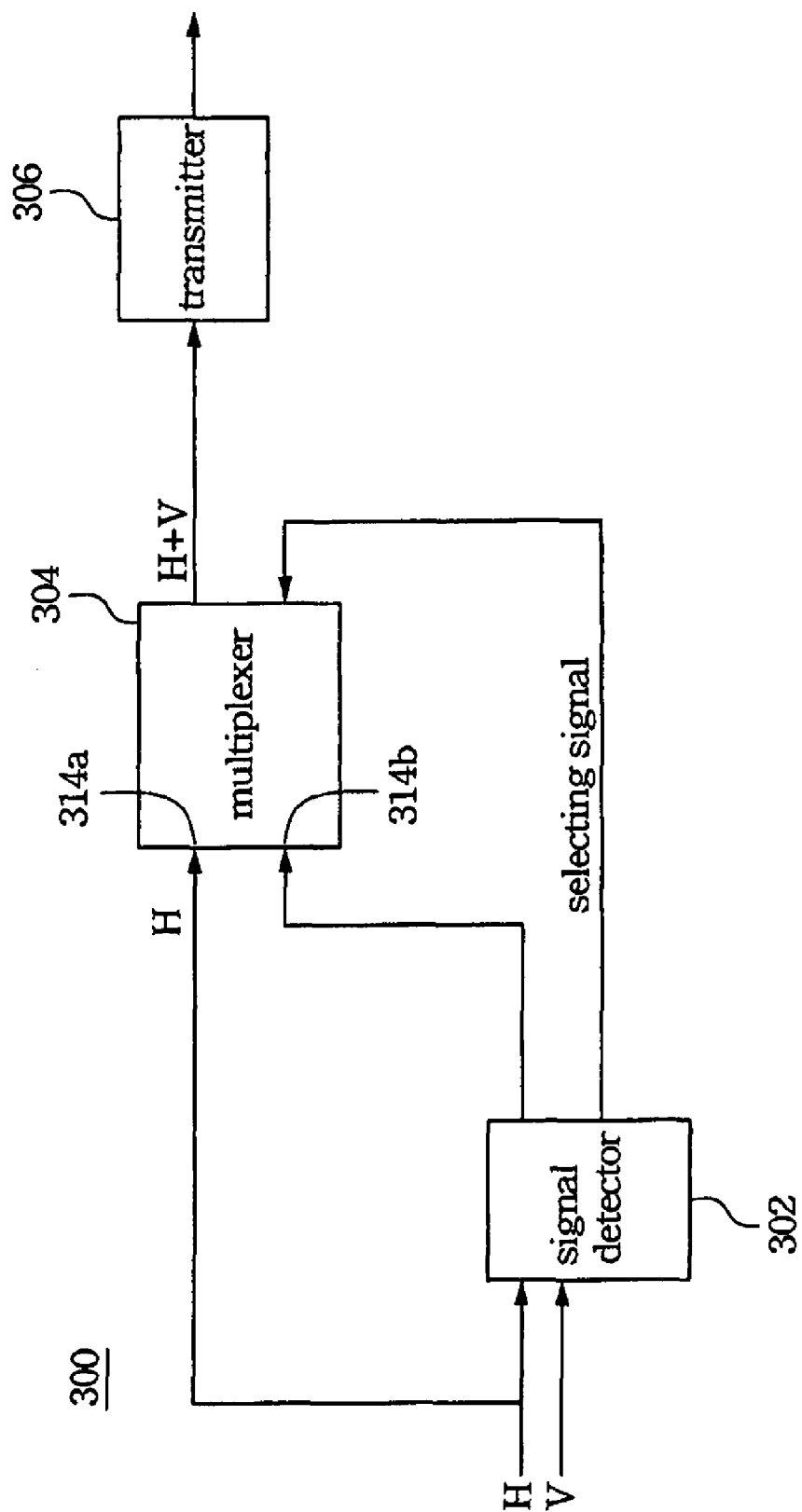
FIG. 3 is an apparatus for transmitting the video signal, which may be applied in the first device in FIG. 2, according to one example consistent with the present invention.

FIG. 3 is an apparatus 300 for transmitting the video signal according to one example consistent with the present invention, which may be applied in the first device 202 in FIG. 2. The apparatus 300 includes, a signal detector 302, a multiplexer 304 and a transmitter 306. The signal detector 302 determines whether the horizontal sync signal (H) and the vertical sync signal (V) of the video signal are independent or composite. If the video signal initially contains a composite sync signal before it inputs into the first device 202, the signal detector 302 controls the multiplexer 304 to bypass pass the composite sync signal to the transmitter 306. If the video signal initially contains independent horizontal sync signal (H) and vertical sync signal (V), the signal detector 302 controls the multiplexer 304 to generate a composite sync signal (H+V) by combining the horizontal sync signal (H) and the vertical sync signal (V) with reference to timing characteristics of the horizontal sync signal (H) and the vertical sync signal (V). Then, the transmitter 306 transmits the composite sync signal (H+V), for example, from the first device 202 to the second device 204 in FIG. 2. The transmitter 306 and the receiver (not shown) in the second device 204 may be implemented with different capabilities according the transmitting media. For example, if the video signal is to be transmitted in the form of differential signal via a CAT. 5 cable, the transmitter 306 may need to have the capability of converting the received single ended signals, e.g. R, G, H+V+B signals, to differential signals, and then feeding each of them to a pair of the twisted transmission lines of the CAT. 5 cable. And, a receiver (not shown) in the second device 204 may receive the differential signals and convert them back to single ended signals.

Figure 4A:
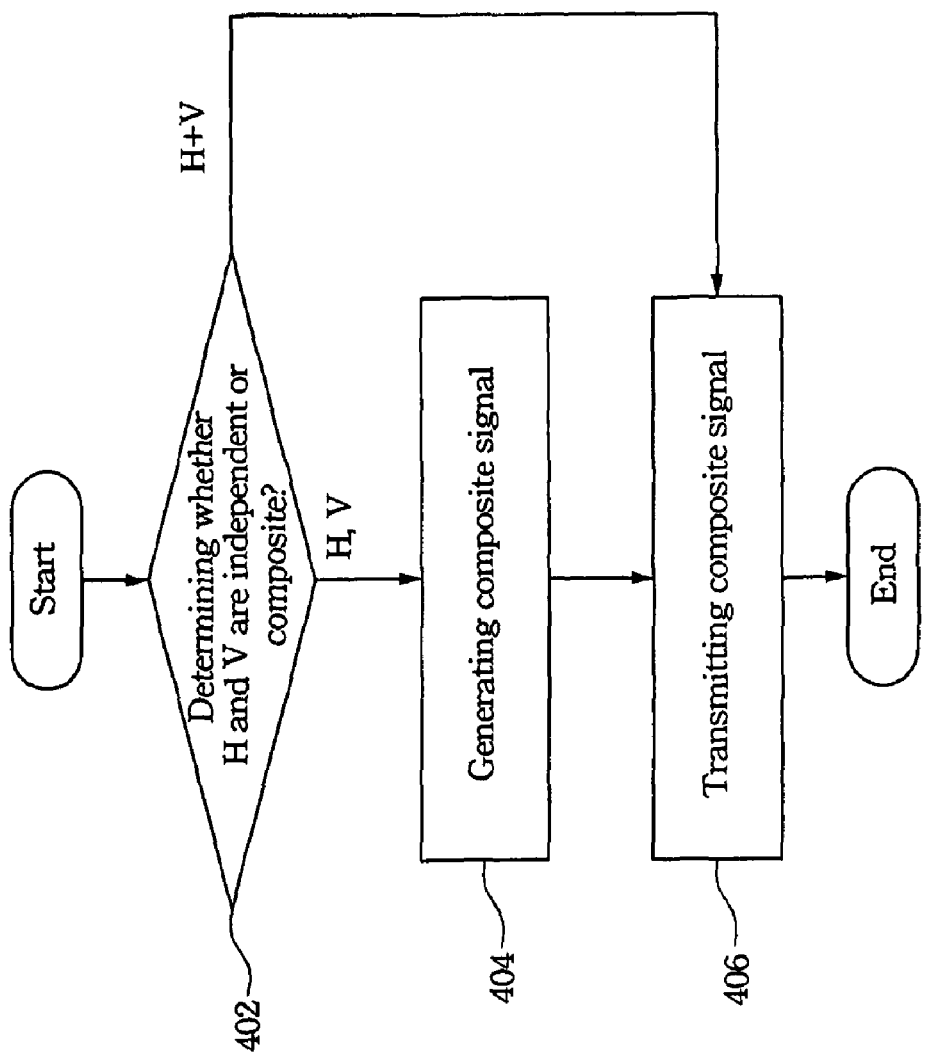
FIG. 4A is a flow chart of a method for transmitting the video signal, which may be performed by the first device in FIG. 2, according to one example consistent with the present invention.

FIG. 4A is a flow chart of a method for transmitting the video signal according to one example consistent with the present invention, which may be performed by the first device 202 in FIG. 2. The detected video signal is to be determined whether the video signal has a horizontal sync signal (H) and a vertical sync signal (V) or has a composite sync signal (step 402). When the video signal comprises independent horizontal sync signal (H) and vertical sync signal (V), then a composite sync signal (H+V) is generated by combining the horizontal sync signal (H) and the vertical sync signal (V) with reference to timing characteristics of the horizontal sync signal (H) and the vertical sync signal (V) (step 404). Then, the composite sync signal (H+V) is transmitted (step 406).

Figure 4B:
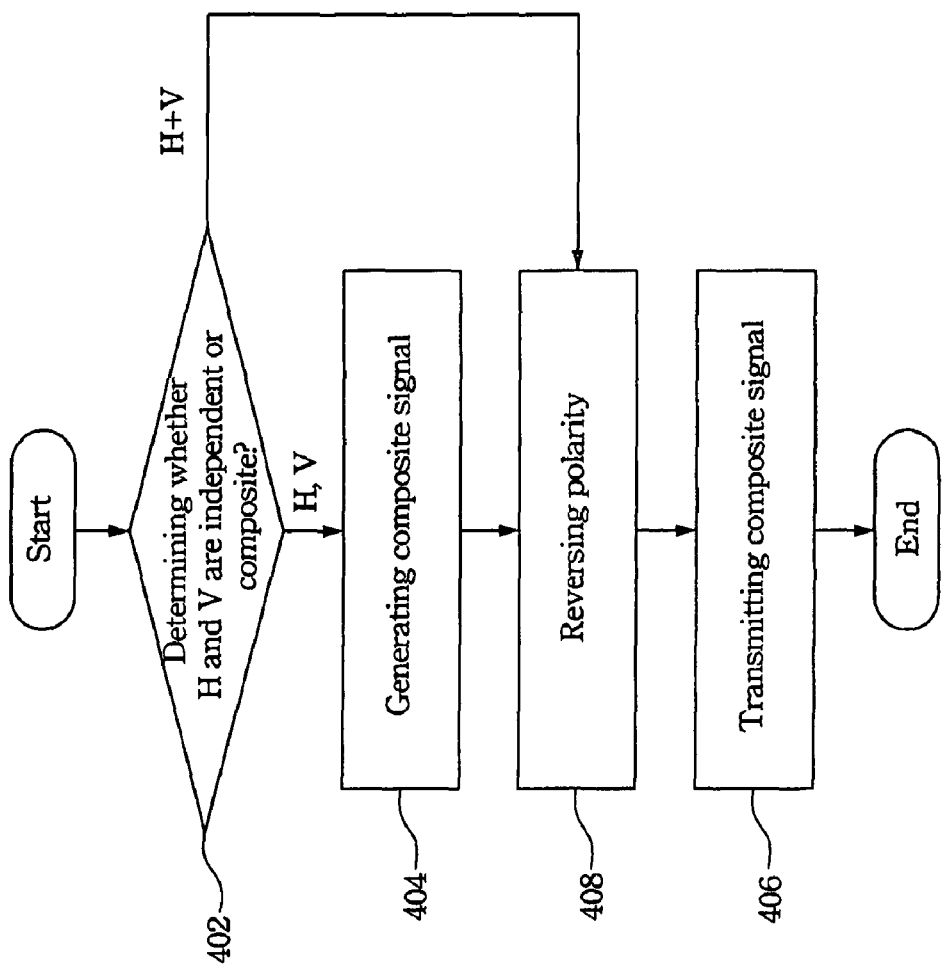
FIG. 4B is a flow chart of a method for transmitting the video signal, which may be performed by the first device in FIG. 2, according to another example consistent with the present invention.

The following description is made with reference to FIGS. 3 and 4. The multiplexer 304 has a first input port 314a and a second input port 314b. The horizontal sync signal (H) is inputted into the first input port 314a, and a signal from the signal detector 302, which may be the vertical sync signal (V) or the composite sync signal (H+V) depending on the detection of the signal detector 302, is inputted into the second input port 314b.

The multiplexer 304 outputs the composite sync signal (H+V) to the transmitter 306 when the signal detector 302 determines that the video signal originally has the composite sync signal (H+V). That is, in the apparatus 300, whether the video signal has the composite sync signal (H+V) or not is firstly determined before performing the generating of step 404. If the video signal inputted into the apparatus 300 is provided from the Sun workstation, which originally contains the composite sync signal (H+V) instead of two independent sync signals (H) and (V), the apparatus 300 can recognize it and then directly output the composite sync signal (H+V) for signal transmission.

The timing characteristics, which are provided for generating the composite sync signal (H+V), may include rise time, fall time, interval of the horizontal and vertical sync signals (H and V), or their combination, or other suitable timing characteristics. More particularly, the signal detector 302, e.g. a microprocessor, can generate a selecting signal according to the timing characteristics, such as rise time, fall time and interval of the horizontal sync signal (H) and the vertical sync signal (V). Then, the multiplexer 304 generates the composite sync signal (H+V) by outputting the horizontal sync signal (H) when the selecting signal is at a first logic level, and outputting the vertical sync signal (V) when the selecting signal is at a second logic level.

Figure 5:
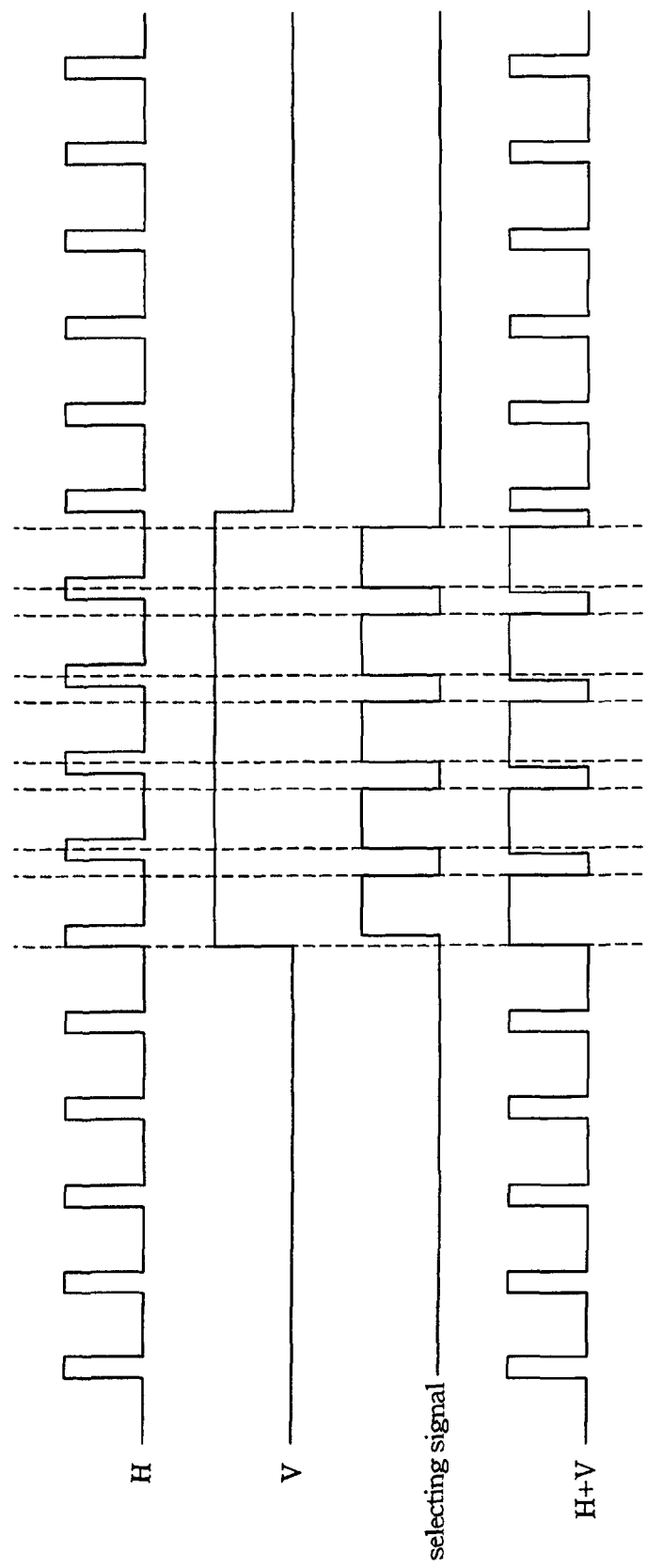
FIG. 5 illustrates the timing diagram of the horizontal sync signal (H), the vertical sync signal (V), the selecting signal, and the composite sync signal (H+V) according to one example consistent with the present invention.

FIG. 5 illustrates the timing diagram of the horizontal sync signal (H), the vertical sync signal (V), the selecting signal, and the composite sync signal (H+V) generated by the selecting signal according to one example consistent with the present invention. When the selecting signal is at the first logic level, e.g. at a low logic level, the multiplexer 304 outputs the signal received by the first input port 314a, i.e. the horizontal sync signal (H). On the other hand, when the selecting signal is at the second logic level, e.g. at a high logic level, the multiplexer 304 outputs the signal received by the second input port 314b, i.e. the vertical sync signal (V). And therefore the composite sync signal (H+V) is generated by selectively outputting the signal received by its two input ports 314a and 314b.

In other words, the signal detector 302 controls the multiplexer 304 with the selecting signal to combine the signals received from the two input ports 314a and 314b. As described above, if the video signal originally contains the composite sync signal (H+V) and the signal received from the signal detector 302 by the first port 314a is thus the composite sync signal (H+V), the signal detector 302 will control the multiplexer 304 with the selecting signal to output the composite sync signal (H+V).

The transmitter 306 can transmit the composite sync signal (H+V) generated by the multiplexer 304, from the first device 202 to the second device 204, for example, via the cable 206, or an optical fiber, or even wirelessly, as illustrated in FIG. 2. In the example, the cable 206 generally has at least three pairs of wires, and each of the three color signals (R), (G) and (B) of the video signal are transmitted by one of the three pairs of wires, respectively. The cable 206 can be a CAT. 5 cable, a CAT. 5e cable, a CAT. 6 cable, a CAT. 6a cable or a CAT. 7 cable, which is available for transmitting video signals in the art.

Figure 6:
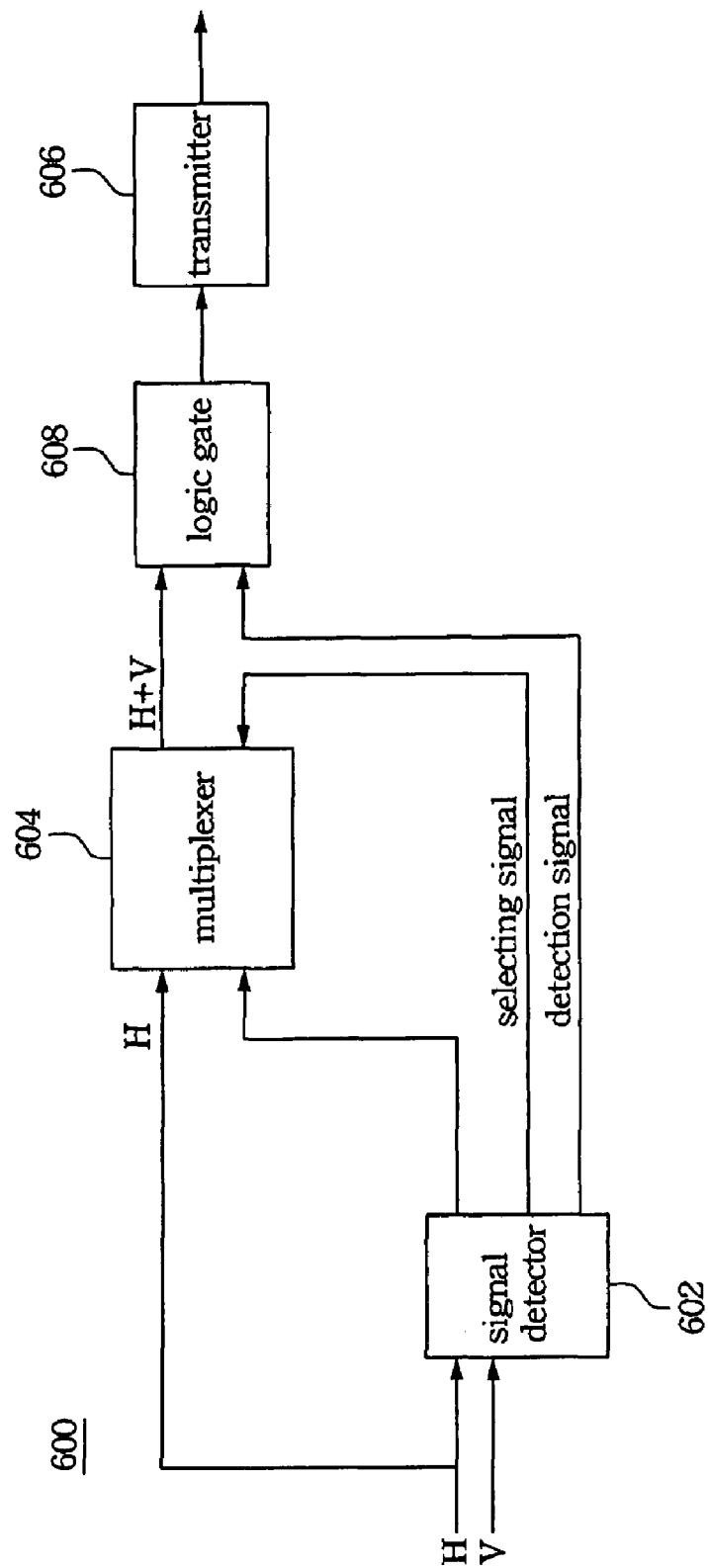
FIG. 6 is an apparatus for transmitting the video signal according to another example consistent with the present invention.

FIG. 6 is an apparatus 600 for transmitting the video signal according to another example consistent with the present invention. Compared to the apparatus 300 in FIG. 3, the apparatus 600 further has a logic gate 608 for reversing polarity of the composite sync signal (H+V) before the transmitter 606 transmits the composite sync signal (H+V). In the example, in addition to the selecting signal for controlling the multiplexer 604, the signal detector 602 further generates a detection signal indicative of transitions of the horizontal sync signal (H), and the logic gate 608 reverses the polarity of the composite sync signal (H+V) according to the detection signal (step 408 in FIG. 4B).

More particularly, when the horizontal sync signal (H) transits from the low logic level to the high logic level, the detection signal is then set to be at the low logic level. On the other hand, when the horizontal sync signal (H) transits from the high logic level to the low logic level, the detection signal is then set to be at the high logic level. Then, the detection signal and the composite sync signal (H+V) are inputted into the logic gate 608, e.g. a XOR gate in the example, to reverses the polarity of the composite sync signal (H+V).

The present invention may also be applicable to a video extender or a KVM switch for transmitting video signals having a horizontal sync signal and a vertical sync signal. The required elements and operations of the transmitting process in those applications are identical to the aforementioned descriptions, and therefore will not be described for conciseness.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for transmitting a video signal having a horizontal sync signal and a vertical sync signal from a source to a destination, comprising the steps of:
   detecting the video signal from the source to determine whether the horizontal sync signal and the vertical sync signal are independent or composite;
   if the horizontal sync signal and the vertical sync signal are independent, generating a composite sync signal by combining the horizontal sync signal and the vertical sync signal with reference to at least one timing characteristic of the horizontal sync signal and the vertical sync signal;
   if the horizontal sync signal and the vertical sync signal are composite, passing the composite sync signal for transmission; and
   transmitting the video signal with the composite sync signal to the destination via a media.

2. The method as claimed in claim 1, wherein the at least one timing characteristic is a rise time, fall time, interval of the horizontal sync signal and the vertical sync signal or combinations thereof.

3. The method as claimed in claim 1, further comprising steps of: generating a selecting signal according to the at least one timing characteristic; and generating the composite sync signal according to the selecting signal, by which selectively outputting the horizontal sync signal when the selecting signal is at a first logic level, and outputting the vertical sync signal when the selecting signal is at a second logic level.

4. The method as claimed in claim 1, further comprising a step of: reversing polarity of the composite sync signal after combining the horizontal sync signal and the vertical sync signal.

5. The method as claimed in claim 4, wherein the polarity of the composite sync signal is reversed according to transitions of the horizontal sync signal.

6. The method as claimed in claim 5, wherein the polarity of the composite sync signal is reversed by a XOR logic gate.

7. The method as claimed in claim 1, wherein the media is a cable comprising plural pairs of wires.

8. The method as claimed in claim 7, wherein the composite sync signal is transmitted by one pair of wires of the cable.

9. An apparatus for transmitting a video signal having a horizontal sync signal and a vertical sync signal from a source to a destination, comprising:
   a signal detector for detecting the video signal from the source to determine whether the horizontal sync signal and the vertical sync signal are independent or composite;
   a multiplexer for generating a composite sync signal by combining the horizontal sync signal and the vertical sync signal with reference to at least one timing characteristic of the horizontal sync signal and the vertical sync signal while the horizontal sync signal and the vertical sync signal are detected as independent signals, and bypassing passing the composite sync signal while the horizontal sync signal and the vertical sync signal are detected as the composite sync signal; and
   a transmitter for transmitting the video signal with the composite sync signal to the destination via a media.

10. The apparatus as claimed in claim 9, wherein the at least one timing characteristic is a rise time, fall time, interval of the horizontal sync signal and the vertical sync signal or combinations thereof.

11. The apparatus as claimed in claim 9, wherein the signal detector further generates a selecting signal according to the at least one timing characteristic, and the multiplexer generates the composite sync signal according to the selecting signal, by which selectively outputting the horizontal sync signal when the selecting signal is at a first logic level, and outputting the vertical sync signal when the selecting signal is at a second logic level.

12. The apparatus as claimed in claim 9, further comprising: a logic gate for reversing polarity of the composite sync signal before the transmitter transmits the composite sync signal.

13. The apparatus as claimed in claim 12, wherein the signal detector further generates a detection signal indicative of transitions of the horizontal sync signal, and the logic gate reverses the polarity of the composite sync signal according to the detection signal.

14. The apparatus as claimed in claim 13, wherein the logic gate is a XOR logic gate.

15. The method as claimed in claim 9, wherein the media is a cable comprising plural pairs of wires.

16. The method as claimed in claim 15, wherein the composite sync signal is transmitted by one pair of wires of the cable.

17. A KVM switch comprising the apparatus for transmitting a video signal as in any one of claims 9-12.

* * * * *